United States Patent

Hinkel

[11] Patent Number: 6,056,092
[45] Date of Patent: May 2, 2000

[54] TORQUE CONVERTER WITH BRIDGE COUPLING AND VIBRATION DAMPER BETWEEN BRIDGE COUPLING AND TURBINE HUB

[75] Inventor: Rüdiger Hinkel, Röthlein/Heidenfeld, Germany

[73] Assignee: Mannesmann Sachs AG, Schweinfurt, Germany

[21] Appl. No.: 09/207,949

[22] Filed: Dec. 9, 1998

[30] Foreign Application Priority Data

Dec. 9, 1997 [DE] Germany .............. 197 54 652

[51] Int. Cl.[7] .................................................. F16H 45/02
[52] U.S. Cl. ................................ 192/3.29; 192/212
[58] Field of Search ........................ 192/3.28, 3.29, 192/206, 212

[56] References Cited

U.S. PATENT DOCUMENTS

| | | | |
|---|---|---|---|
| 5,248,016 | 9/1993 | Umezawa | 192/3.28 |
| 5,310,033 | 5/1994 | Shibayama | 192/3.29 |
| 5,746,296 | 5/1998 | Wirtz | 192/3.29 |
| 5,771,998 | 6/1998 | Olsen et al. | 192/3.29 |
| 5,782,327 | 7/1998 | Otto et al. | 192/3.29 |
| 5,813,505 | 9/1998 | Olsen et al. | 192/3.28 |

FOREIGN PATENT DOCUMENTS 34 10 526 A1   10/1985   Germany .

*Primary Examiner*—Charles A. Marmor
*Assistant Examiner*—Saúl Rodríguez
*Attorney, Agent, or Firm*—Cohen, Pontani, Lieberman & Pavane

[57] ABSTRACT

A torque converter includes a converter housing and a turbine wheel arranged in the converter housing. The turbine wheel is rotatable relative to the housing around a rotational axis (A) and has a turbine wheel shell which carries a plurality of turbine blades as well as a turbine wheel hub connected to the turbine wheel shell. An optional bridge coupling selectively connects the converter housing to the turbine wheel. A torsional vibration damper via which torque can be conveyed to the turbine wheel hub from the turbine wheel shell and/or the bridge coupling includes a hub element with control regions, a first covering element section and a second covering element section having control regions on either circumferential side of the hub element, and spring elements circumferentially arranged and supported between control regions. The first and second covering element sections are provided on the turbine wheel hub.

7 Claims, 2 Drawing Sheets

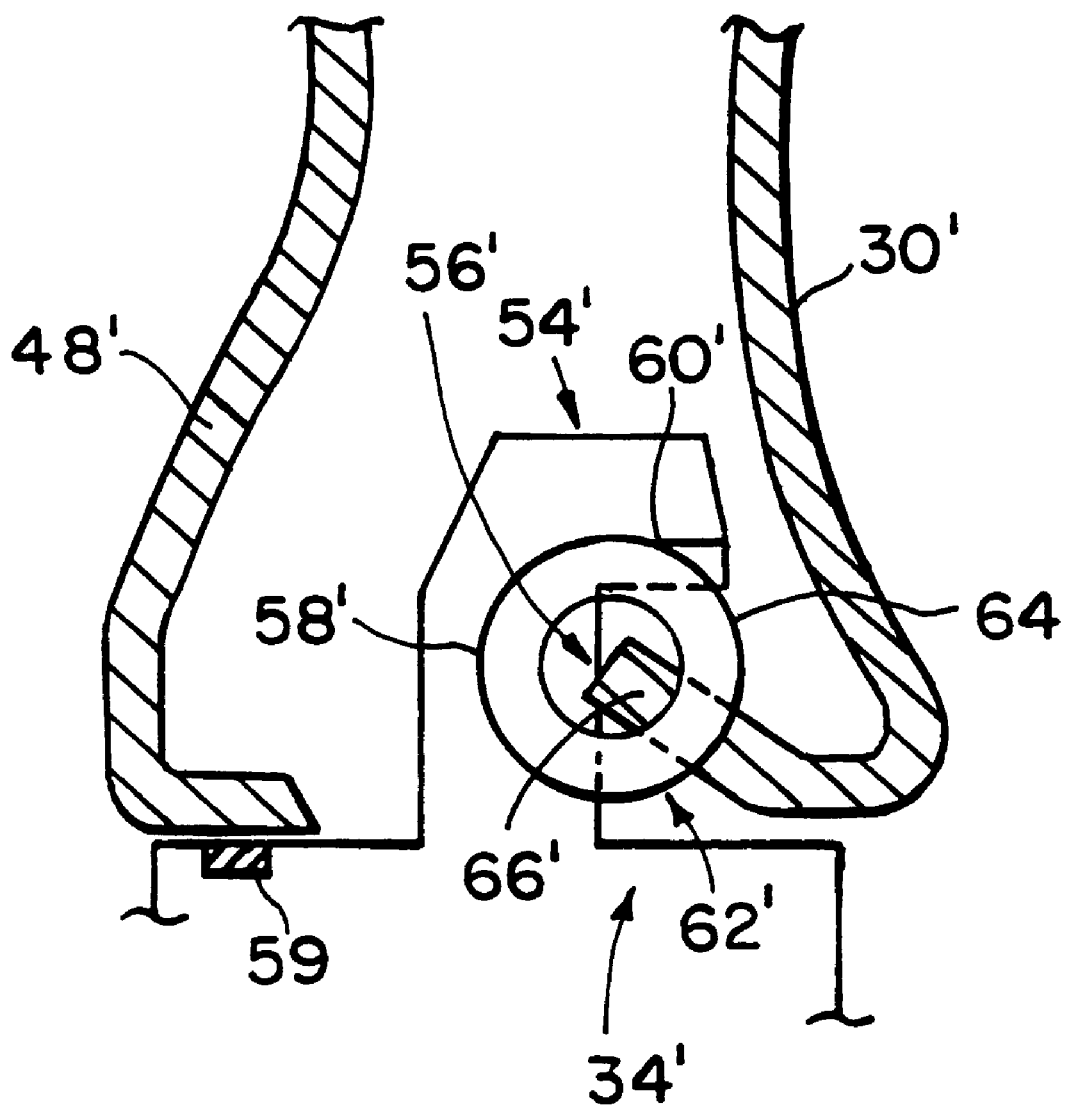

TORQUE CONVERTER WITH BRIDGE COUPLING AND VIBRATION DAMPER BETWEEN BRIDGE COUPLING AND TURBINE HUB

SUMMARY OF THE INVENTION

The object of the present invention is to provide a generic torque converter that has a reduced number of parts, is easy to assemble, and has improved torsion damping characteristics.

According to the invention, this object is attained by a torque converter comprising a converter housing and a turbine wheel that is arranged in the converter housing so as to be rotatable relative thereto around a rotational axis and has a turbine wheel shell which carries a plurality of turbine blades. The turbine wheel also has a turbine wheel hub connected to the turbine wheel shell. An optional bridge coupling may be provided for selectively connecting the converter housing and the turbine wheel. The torque converter also has a torsional vibration damper for conducting torque transmitted to the turbine wheel hub from the turbine wheel shell and, as applicable, the bridge coupling. The torsional vibration damper comprises a hub element with control regions for the support of end regions of damping springs and a first covering element section and a second covering element section that are arranged for supporting the end regions of the damping springs substantially on both sides of the hub element with control regions corresponding to the control regions of the hub element.

In the torque converter according to the invention, the first and the second covering elements are provided on the turbine wheel hub. The provision of the first and second covering elements on the turbine wheel hub reduces the number of individual parts. The incorporation of the torsional vibration damper into this arrangement requires only the addition of essentially one element, i.e., a hub element. According to the prior art, a radial flange provided on the turbine wheel hub and two covering element sections are added to the torque converter parts. This reduction in the number of additional parts also leads to a simpler assembly of the torque converter having a torsional vibration damper.

In a preferred embodiment, the first and second covering element sections are integrally embodied on the turbine wheel hub. In other words, a single integrated component performs the function of the turbine wheel hub as well as the function of the two covering element sections.

For example, it is possible for a recess extending in a substantially annular fashion around the rotational axis to be embodied on the turbine wheel hub so that the wall sections of the recess form the first and second covering element sections.

The assembly of the torque converter according to the invention, especially in the area of the torsional vibration damper, is considerably simplified when the recess is open in substantially the axial direction and at least one bottom wall section and a radially outer wall section form the first or the second covering element section.

In a further embodiment, projections with lateral surfaces facing in the circumferential direction form the control regions on the first and second covering element sections.

To protect the damping springs of the torsional vibration damper against axial displacement, a securing section protruding radially inwardly is embodied in the area of a free end of a radially outer wall section.

To further reduce the number of parts in the torque converter according to the invention, the hub element comprises a section of a further converter component which extends between the two covering elements. The further converter component may, for example, comprise a piston of the bridge coupling or a component connected thereto. In this case, it is preferable that the recess be open substantially on a side facing a cover of the converter housing.

Alternatively, the further component may comprise the turbine wheel shell or a component connected thereto. In this case, it is preferable that the recess be open substantially on a side facing away from a cover of the converter housing.

In this embodiment, the torsional vibration damper thus acts between the turbine wheel shell and the turbine wheel hub, whereby sections of the turbine wheel shell and the turbine wheel hub are integrated into the torsional vibration damper, i.e., constitute components or sections thereof. In this embodiment, the bridge coupling is advantageously embodied so as to connect the turbine wheel shell to the converter housing.

The turbine wheel hub is advantageously produced with the first and the second covering element sections in a sintering process.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views:

FIG. 2 shows another embodiment of the area II of the torque converter of FIG. 1.

DETAILED DESCRIPTION OF THE PRESENTLY PREFERRED EMBODIMENTS

Figure 1:
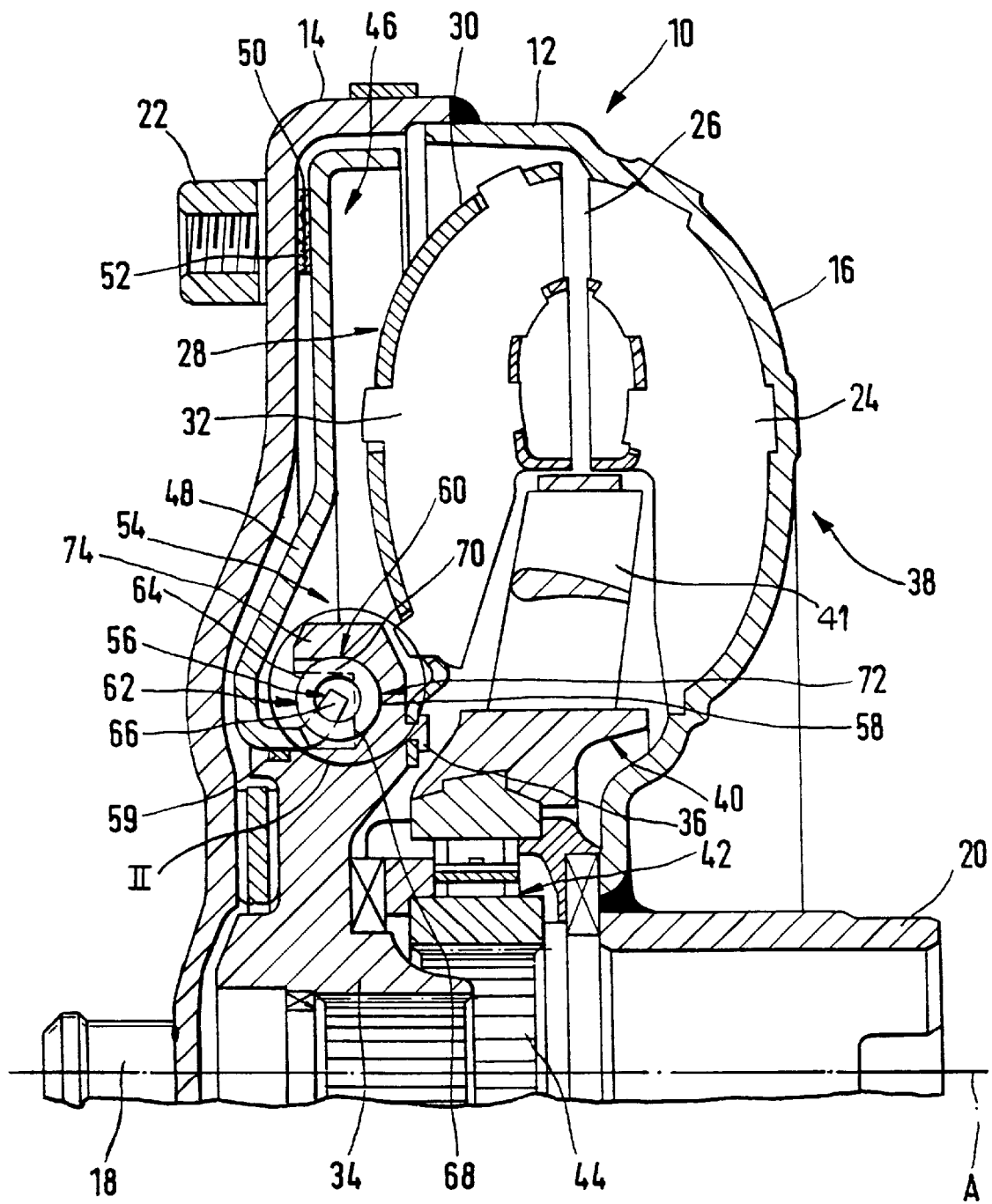
FIG. 1 shows a partial longitudinal sectional view of a torque converter according to an embodiment of the present invention.

A torque converter 10 according to an embodiment of the present invention is shown in FIG. 1 and comprises a converter housing 12. The converter housing 12 includes a converter cover 14 securely connected to a pump shell 16 at their radially outer ends, for example, by welding. On the radially inner sides, the cover 14 and the pump shell 16 are connected to respective hubs 18, 20, for example, by welding. The cover 14 also includes coupling elements 22 (one of which is shown in FIG. 1) which are used to attach the converter housing 12, and thus the entire torque converter, to a flex plate connected to an output shaft of an internal combustion engine or other motor. The pump shell 16 carries a plurality of circumferentially arranged pump blades 24.

A turbine wheel 28 is rotatably mounted within an interior 26 of the converter housing 12. The turbine wheel 28 comprises a turbine wheel shell 30, which carries a plurality of turbine wheel blades 32 arranged one after the other in the circumferential direction, and also comprises a turbine wheel hub 34, which is connected in its radially inner area by an axial toothing to a converter output shaft in rotation-proof fashion. The turbine blades 32 are securely connected in a known manner to the turbine wheel shell 30, for example, by soldering or welding.

In the embodiment depicted in the drawing, an inner radial area of the turbine wheel shell 30 is connected to the turbine wheel hub 34 in rotation-proof fashion by connecting elements such, for example, as bolts 36. The connection may also be established by welding.

A guide wheel 40 is arranged between the turbine wheel 28 and the pump wheel 38 having a plurality of guide wheel blades 41 and is connected via a free-wheeling mechanism 42 to a guide wheel hub 44.

The torque converter 10 further comprises a bridge coupling 46 with a piston 48 which has a friction lining 50 in its radially outer area. Instead of the radially outer area, the friction lining 50 may also be positioned in other areas of the piston 48. The friction lining 50 is selectively brought into contact, for the purpose of establishing the bridging state, with a counter friction surface 52 arranged on the cover 14 of the converter housing 12. It should be noted that to establish the friction engagement between friction lining 50 and counter friction surface 52, many different configurations may be used. For example, a friction lining may be arranged on the cover 14 instead of a counter friction surface. Furthermore, the configuration or the surface embodiment of the different friction linings and/or friction surfaces may be embodied in a wide variety of ways.

To establish the bridging state, a working fluid pressure in the interior 26 of the torque converter 10 is increased. The piston 48 is urged to the left in FIG. 1 by the higher pressure and the friction lining 50 is pressed against the counter friction surface 52. A torque connection between the converter housing 12 and the turbine wheel hub 34 is then created, so that a torque may be transmitted via the torque converter 10 substantially without slip.

As FIG. 1 also shows, the torque converter 10 according to the invention has a torsional vibration damper 54 which connects the piston 48 to the turbine wheel hub 34. Sections of the piston 48 or of the turbine wheel hub 34 thereby form, in the manner described below, components of the torsional vibration damper 54.

The piston 48 of the bridge coupling 46 is rotatably mounted on the turbine wheel hub 34 with a sealing ring 59 mounted therebetween. A radially inner section of the piston 48 forms a hub element 56 for the torsional vibration damper 54. A radially outer section of the turbine wheel hub 34 has a recess 62 with wall sections 58, 60 that form covering element sections 58, 60 arranged substantially on both sides of the hub element 56. The torsional vibration damper 54 has, in a known manner, a plurality of circumferentially arranged damping springs 64, which are arranged around a rotational axis A of the torque converter 10. Control regions 66, 68, 70 are formed both on the hub element 56 and on the respective wall sections 58, 60 for holding the plural springs 64. These control regions 66, 68, 70 have lateral surfaces facing in the circumferential direction. The springs 64 rest in the circumferential direction on these lateral surfaces of the control regions 66, 68, 70. In a known manner, two lateral surfaces of the control regions 66, 68, 70 on the hub element 56 or the covering element sections 58, 60 which face each other border a spring aperture in which one or more of the springs 64 are arranged. In other words, each spring aperture has, at its two ends in the circumferential direction, a control region 66 on the hub element 56 as well as a control region 68 or 70 on the covering element sections 58, 60. When torque is introduced such as during relative rotation between the piston 48 and the turbine wheel hub 34, the springs 64 are pressurized at one of their end areas by the control region 66 of the hub element 56. The other ends of the springs 64 are pressurized by the control regions 68, 70 of the covering element sections 58, 60 located at the other end, in the circumferential direction, of the particular spring aperture.

It should be noted that the covering element sections 58, 60 are formed on the radially outer area and on the blind end 72 of the recess 62. Thus, the control regions 68, 70, which are indicated in dashed lines in the drawing, are also embodied in these areas. There is thus a L-shaped configuration of the covering element sections and control regions, into which the hub element 56 extends.

As FIG. 1 shows, the recess 62 opens in the axial direction. That is, the open end of the recess 62 faces the cover 14. This permits simple insertion of the springs 64 into the region between the respective covering element sections 58, 60, without having to move these covering element sections 58, 60 relative to each other. At the same time, however, the radially outer wall section or the covering element section 60 protect the springs 64 against radially outward movement during rotary operation. Protection against axial movement is provided by the blind end 72 of the recess 62, which secures the springs in one axial direction, and by a second projecting radially inward from a free end 74 of the radially outer wall section 60, which secures the springs 64 in the other axial direction. It is important, however, that the free space between this projection and the radially inner wall section 58 be large enough that the springs 64 can be introduced in the axial direction into the opening 62.

The number of parts required to construct the torque converter 10 according to the present invention is minimized because the covering element sections 58, 60 in the torque converter 10 according to the invention are formed by wall sections 58, 60 of the recess 62 which are part of the turbine wheel hub 34. The recess 62 is formed relative to a hub element 56 that is part of the piston 48 of the bridge coupling 46. Therefore, to construct the torsional vibration damper 54, only the springs 64 must be provided as additional components. Other than the springs 64, all parts and components of the torsional vibration damper 54 are formed by components already present in the torque converter 10. This also simplifies the work procedures necessary to assemble the torque converter 10.

It should be pointed out that different modifications of the torque converter 10 according to the invention are possible. For example, the recess 62' may open on the opposite axial side as shown in FIG. 2. In this embodiment, the hub element 56' with control region 66' of the torsional vibration damper 54 is formed by a radially inner area of the turbine wheel shell 30 that extends between the two wall sections 58', 60' on the turbine wheel hub 34'. In this case, a connection (not shown) will be established for rotatably fixing the piston 48' of the bridge coupling and the turbine wheel shell. This embodiment has the advantage that the torsional vibration damper then also acts as a so-called turbine damper, which is effective even when the bridge coupling is in the disengaged state. In this embodiment, a bridge coupling 46 is not required because the torsional vibration damper 54' already acts between the turbine wheel shell 30' and the turbine wheel hub 34'.

The opening of the recess 62 may also be oriented so as to point partially radially outward or radially inward. The particular embodiment of the angle depends on the specific design of the torque converter.

To provide the turbine wheel hub 34 in a simple manner with the covering element sections or wall sections 58, 60 embodied integrally thereon, it is proposed that this turbine wheel hub 34 be produced in a sintering process, so that no additional processes are required to create the recess 62. The recess 62 may also be formed on the hub 34, which is produced from a finished steel or sheet metal part, by milling.

It should be noted that the statement that the two covering element sections 58, 60 are arranged on both sides of the hub element not only implies a strictly symmetrical arrangement relative to a longitudinal central axis of the given springs 64, but also implies that support for the springs 64 is provided by the hub element 34 in a central region, seen in the circumferential direction of the springs 64, whereas support for the springs 64 is provided by means of the covering element sections 58, 60 laterally relative to a central region or surrounding this central region. For example, the statement also encompasses the depicted extension of the hub element 34 into covering element sections 58, 60 running toward each other in an L-shaped or V-shaped manner.

The invention is not limited by the embodiments described above which are presented as examples only but can be modified in various ways within the scope of protection defined by the appended patent claims.

I claim:

1. A torque converter, comprising a plurality of converter components including:
   a converter housing rotatably mounted about an axis of rotation and having a cover and a pump wheel connected in a radially outer area;
   a turbine wheel rotatably arranged within said converter housing for rotating about said axis of rotation relative to said converter housing, said turbine wheel having a turbine wheel shell with a plurality of circumferentially arranged turbine blades and a turbine wheel hub connected to a radially inner region of said turbine wheel shell;
   a bridge coupling operatively arranged between said turbine wheel and said cover for selectively connecting said turbine wheel to said cover; and
   a torsional vibration damper operatively arranged for transmitting torque from said turbine wheel hub to one of said bridge coupling and said turbine wheel shell, wherein said torsional vibration damper comprises a damper hub element having control regions facing in the circumferential directions, first and second covering element sections having control regions arranged on both circumferential sides of said hub element, and damping springs arranged between adjacent control regions, and wherein said first and second covering element sections are mounted on said turbine hub, wherein said said turbine wheel hub comprises a recess extending substantially annularly about the axis of rotation and open substantially toward an axial direction, said first and second covering element sections comprising a blind end wall section and a radially outer wall section of said recess, wherein said radially outer wall section of said recess comprises a free end having a radially inwardly projecting section for axially holding said damping springs.

2. The torque converter of claim 1, wherein said first and second covering element sections are formed as an integral unit with said turbine wheel hub.

3. The torque converter of claim 1, wherein said control regions of said first and second covering element sections comprise projections on said wall sections having lateral surfaces facing circumferential directions.

4. The torque converter of claim 1, wherein said damper hub element comprises a section of one of said plural converter components other than said torsional vibration damper, said section extending between said first and second covering element sections.

5. The torque converter of claim 4, wherein said bridge component comprises a piston and said one of said plural converter components comprises one of said piston and a part connected to said piston.

6. The torque converter of claim 5, wherein said recess opens in a direction facing said cover.

7. The torque converter of claim 1, wherein said turbine wheel hub and said first and second covering element sections comprise a material formed in a sintering process.

* * * * *